US011577637B2

(12) United States Patent
Petty

(10) Patent No.: US 11,577,637 B2
(45) Date of Patent: Feb. 14, 2023

(54) TRUCK BED RACK

(71) Applicant: Jon A. Petty, St. George, UT (US)

(72) Inventor: Jon A. Petty, St. George, UT (US)

( * ) Notice: Subject to any disclaimer, the term of this patent is extended or adjusted under 35 U.S.C. 154(b) by 122 days.

(21) Appl. No.: 17/089,554

(22) Filed: Nov. 4, 2020

(65) Prior Publication Data

US 2021/0129734 A1 May 6, 2021

Related U.S. Application Data

(60) Provisional application No. 62/930,040, filed on Nov. 4, 2019.

(51) Int. Cl.
*B60P 7/08* (2006.01)
(52) U.S. Cl.
CPC .................. *B60P 7/0815* (2013.01)
(58) Field of Classification Search
CPC ................................... B60P 7/0815
USPC ................. 410/101, 105, 104, 150
See application file for complete search history.

(56) References Cited

U.S. PATENT DOCUMENTS

| | | | | |
|---|---|---|---|---|
| 5,108,141 A * | 4/1992 | Anderson | ................ | B60R 9/00 296/3 |
| 5,725,137 A * | 3/1998 | Macdonald | ............... | B60R 9/00 296/3 |
| 6,666,490 B1 * | 12/2003 | Thacker | ................ | B60J 7/1614 296/100.1 |
| 8,905,280 B2 * | 12/2014 | Martin | ..................... | B60R 9/00 293/3 |
| 9,440,520 B2 * | 9/2016 | Rohr | ......................... | B60R 9/06 |
| 9,493,123 B2 * | 11/2016 | Martin | ..................... | B60R 9/00 |
| 2003/0168879 A1 * | 9/2003 | Grudek | ..................... | B60P 3/40 296/100.15 |

* cited by examiner

*Primary Examiner* — D Glenn Dayoan
*Assistant Examiner* — Sunsurraye Westbrook
(74) *Attorney, Agent, or Firm* — Gurr Brande & Spendlove, PLLC; Robert A. Gurr

(57) ABSTRACT

A truck bed rack includes a first side panel and a second side panel coupleable to a truck bed. A first upper bar, a second upper bar, and a third upper bar may be coupled to a top, inside surface of the first side panel and the second side panel. A first lower bar and a second lower bar may be coupled to a lower, inside surface of the first side panel and the second panel. The upper and lower bars may be adjusted to expose the entire truck bed to receive any type of cargo. The first and second side panels may couple to the truck bed and be self-supporting. The first and second side panels may include support brackets and support members.

20 Claims, 17 Drawing Sheets

TRUCK BED RACK

CROSS-REFERENCE TO RELATED APPLICATIONS

This application claims the benefit of U.S. Provisional Application Ser. No. 62/930,040, filed on Nov. 4, 2019, which is incorporated herein by reference.

TECHNICAL FIELD

The present disclosure relates to a roof rack used for a truck, typically referred to as a truck bed rack. More particularly, the present disclosure relates to an adjustable truck bed rack that may receive numerous accessories.

BACKGROUND

Cross bars and roof racks have been used for many years to help individuals carry ladders and other long loads, secure shifting cargo, and help carry bulky items. Truck bed racks, which are installed over the bed of a pickup truck, are a derivation of a roof rack. Truck bed racks have many benefits when compared to typical roof racks and cross bars. One of the many benefits of the truck bed rack is that the platforms may be higher than the bed surface, leaving a lot of space for cargo inside of the bed. Truck bed racks have been used for years to increase a truck's carrying capacity and to assist in carrying certain types of gear. For example, some truck bed racks are raised higher than the cab of the truck to carry kayaks, canoes, and in some situations, to secure a tent.

Even with improvements in the industry to truck bed racks, there are still many downsides. For example, the truck bed racks found on the market, especially for off-road vehicles, are often constructed in a manner that severely limits the use of the truck bed. Some of the limits come from non-adjustable cross bars that take up space and prohibit a user from placing large loads inside of the truck bed. Further, many truck bed racks have anchored poles that make it difficult to get cargo in and out of the truck bed. Other truck bed racks have solid roofs or other members that prevent items from being transported in the truck bed.

Therefore, there is a need for a truck bed rack that is adjustable, so as to receive any type of cargo, and that does not interfere with the cargo space available. The present invention seeks to solve these and other problems.

SUMMARY OF EXAMPLE EMBODIMENTS

In one embodiment, a truck bed rack comprises a first side panel and a second side panel coupleable to a truck bed. A first upper bar, a second upper bar, and a third upper bar may be coupled to a top, inside surface of the first side panel and the second side panel. A first lower bar and a second lower bar may be coupled to a lower, inside surface of the first side panel and the second panel. The first and second side panels may couple to the truck bed and be self-supporting, thereby not requiring a cross bar attached for support. The first and second side panels may comprise support brackets and support members. The support members may be pivotally coupled to the support brackets, allowing them to pivot and attach to a side of the truck bed or a bottom of the truck bed.

The first and second side panels may further comprise side accessory plates and rear accessory couplers. The accessory plates and the rear accessory couplers may comprise accessory apertures, which may include t-slot tracks and c-channels. For example, in one embodiment, the accessory plates and rear accessory couplers may receive a cargo box, a ladder, or a fuel canister.

In one embodiment, the truck bed rack comprises a removably attachable cover.

In one embodiment, the truck bed rack comprises a raised double pivoting cross bar. For example, primary upper bars extending between the first and second panels may remain in place for a top mounted device, like a roof tent, while secondary upper bars pivot or slide out to provide support for a shade structure, hammock, or roof tent expansion area.

DETAILED DESCRIPTION OF EXAMPLE EMBODIMENTS

Figure 1:
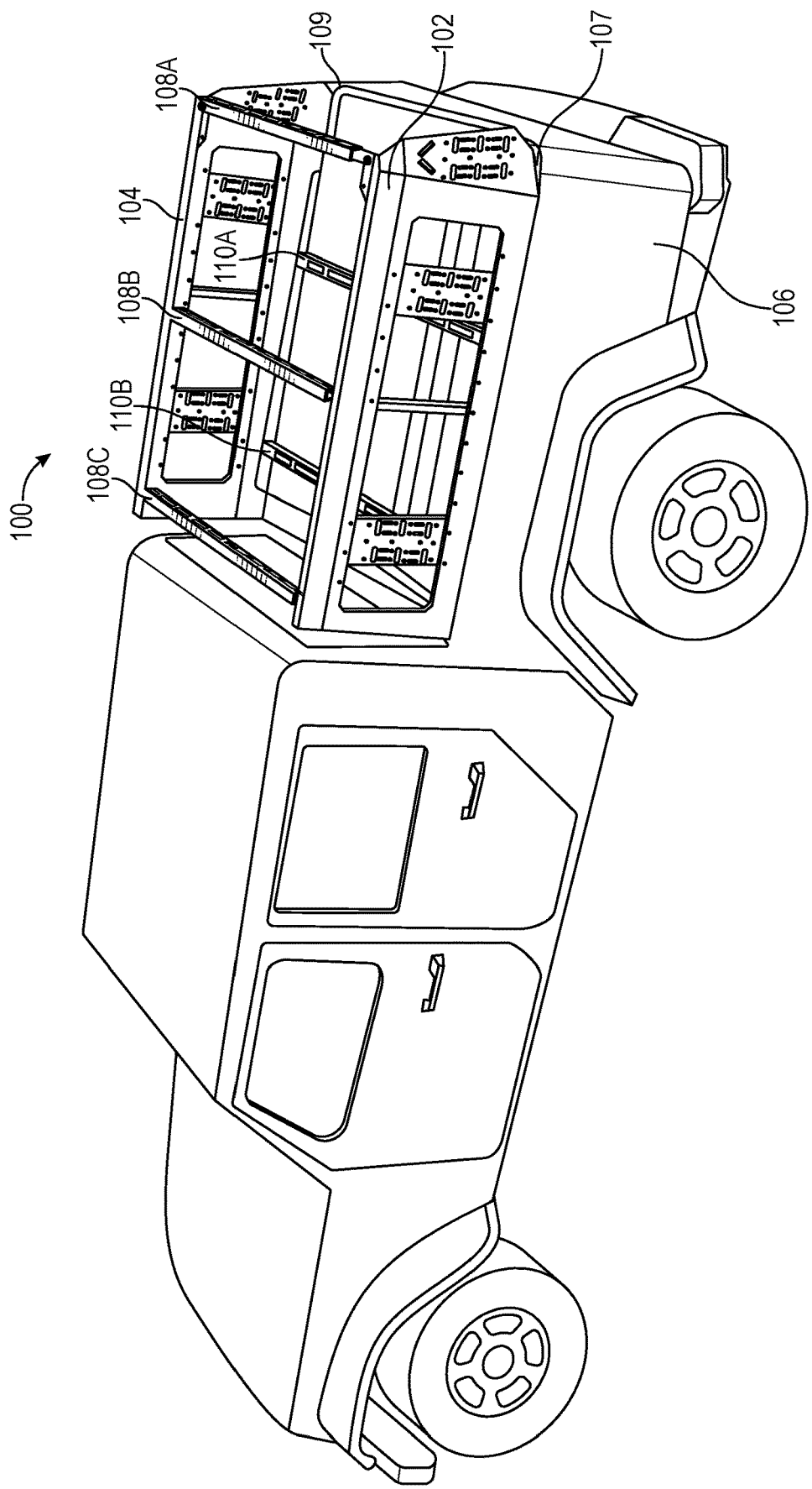
FIG. 1 illustrates a side, top perspective view of a truck bed rack coupled to a truck bed.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a truck bed rack that is adjustable, so as to receive any type of cargo, and that does not interfere with the cargo space available. The present invention seeks to solve these and other problems.

Bed racks in the prior art often severely limit the amount of space that may be used in a truck bed. In other words, many cross bars are not adjustable, preventing large loads from being placed in the truck bed. The truck bed rack described herein generally comprises first and second panels that are attachable to a truck bed. Numerous upper and lower bars may be coupleable to the first and second panels. The upper and lower bars may pivot or be removed so as to allow access to the bed of the truck, thereby allowing any size load or cargo to be inserted therein. Additionally, the truck bed rack comprises accessory plates and rear brackets that may receive various accessories, such as fuel or water canisters, ladders, etc. It will be appreciated that the truck bed rack is highly adjustable to carry any type of cargo and receive numerous accessories.

Figure 2:
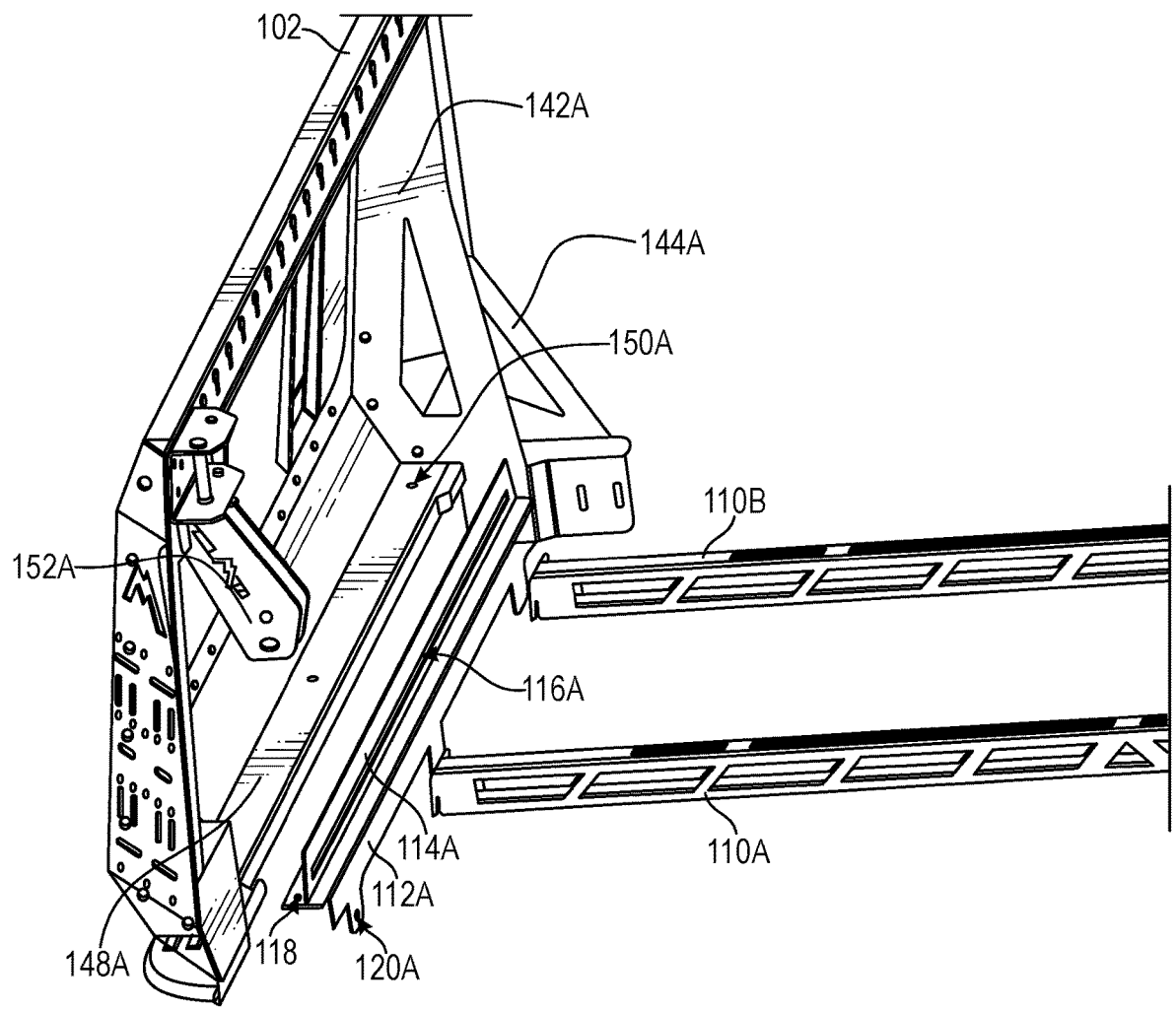
FIG. 2 illustrates a front perspective view of a first panel and a coupling bracket of a truck bed rack.
Figure 3:
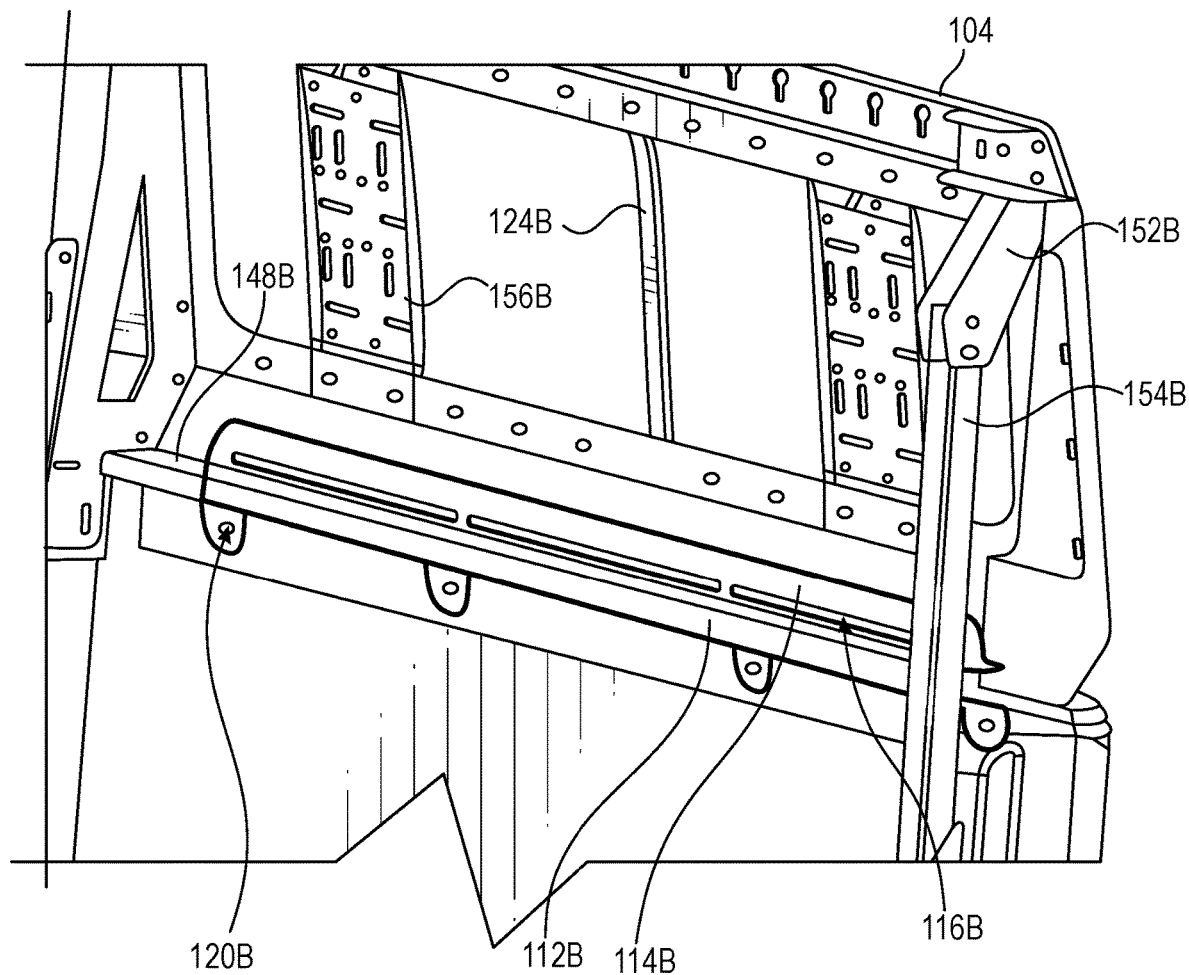
FIG. 3 illustrates a front perspective view of a second panel and a coupling bracket of a truck bed rack.

As illustrated in FIGS. 1-3, in one embodiment, a truck bed rack 100 comprises a first side panel 102 and a second side panel 104, both of which are coupleable to a truck bed 106. In particular, the first panel 102 is coupleable to a first truck edge 107 and the second panel 104 is coupleable to a second truck edge 109. A first upper bar 108A, a second upper bar 108B, and a third upper bar 108C may be coupled to a top, inside surface of the first side panel 102 and may extend and be coupled to a top, inside surface of the second panel 104. In other words, the upper bars 108A-C are interposed between the first side panel 102 and second side panel 104, spanning the truck bed. A first lower bar 110A and a second lower bar 110B may be coupled to a lower, inside surface of the first side panel 102 and extend and be coupled to a lower, inside surface of the second side panel 104. For example, the lower bars 110A, 110B may couple to the base 148A, 148B (FIG. 3) of each side panel 102, 104, spanning the bed of the truck. While cross bars are illustrated (108A-C, 110A-B), they are not required. For example, the first and second side panels 102, 104 may couple to the truck bed 106 and be self-supporting, thereby not requiring a cross bar attached thereto for support, as will be discussed in greater detail herein. The first and second side panels 102, 104 may couple to the truck bed 106 via coupling brackets 112A, 112B. However, the upper bars 108A-C may provide additional structural support to the side panels 102, 104, as well as allow for additional storage or use. For example, a user may secure items atop the upper bars 108A-10C or may use it to support items such as a tent. The lower bars 110A-110C allow a user to divide up the space in the bed, allowing things to be secured to the lower bars 110A-110C while still providing for storage of items on the truck bed beneath the lower bars 110A-110C. In one embodiment, the lower bars may also be used to support items, such as a mattress or other sleeping items, which may be used in connection with a tent or removably attachable cover (188 in FIG. 21).

Referring to FIGS. 2-3, the coupling brackets 112A, 112B may attach to the truck bed 106 via bolts and nuts, pins, or any other attachment mechanism. In one embodiment, the coupling brackets 112A, 112B couple directly to the side of the bed behind Jeep's® optional "trail rail mounting system." In an alternate embodiment, the coupling brackets 112A, 112B couple directly to Jeep's® optional "trail rail mounting system." While Jeep® is discussed above as receiving the coupling brackets 112A, 112B, it will be appreciated that any other manufacturer's truck may receive the coupling brackets. The coupling brackets 112A, 112B may comprise sidewall 114A, 114B with channels 116A, 116B to receive the first and second lower bars 110A, 110B. The coupling brackets 112A, 112B may further comprise panel apertures 118 to couple the first and second panels 102, 104 thereto, and bed apertures 120A, 120B which may receive bolts so as to be coupleable to the rail (or sidewall) of the truck bed 106. In one embodiment, instead of using bolts, a user may also secure the base 148A, 148B and/or accompanying bracket 112A, 112B to the truck bed rail using clamps (e.g., camper clamps, shell clamps, or similar clamps). It will be appreciated that while brackets 112A, 112B are shown, they are not required. In other words, the base 148A, 184B of each side panel may be coupled directly to the bed rail of the truck. In one embodiment, the features of the bracket 112A, 112B, such as the sidewall 114A, 114B and channels 116A, 116B, are integrated with the base 148A, 148B.

Figure 4:
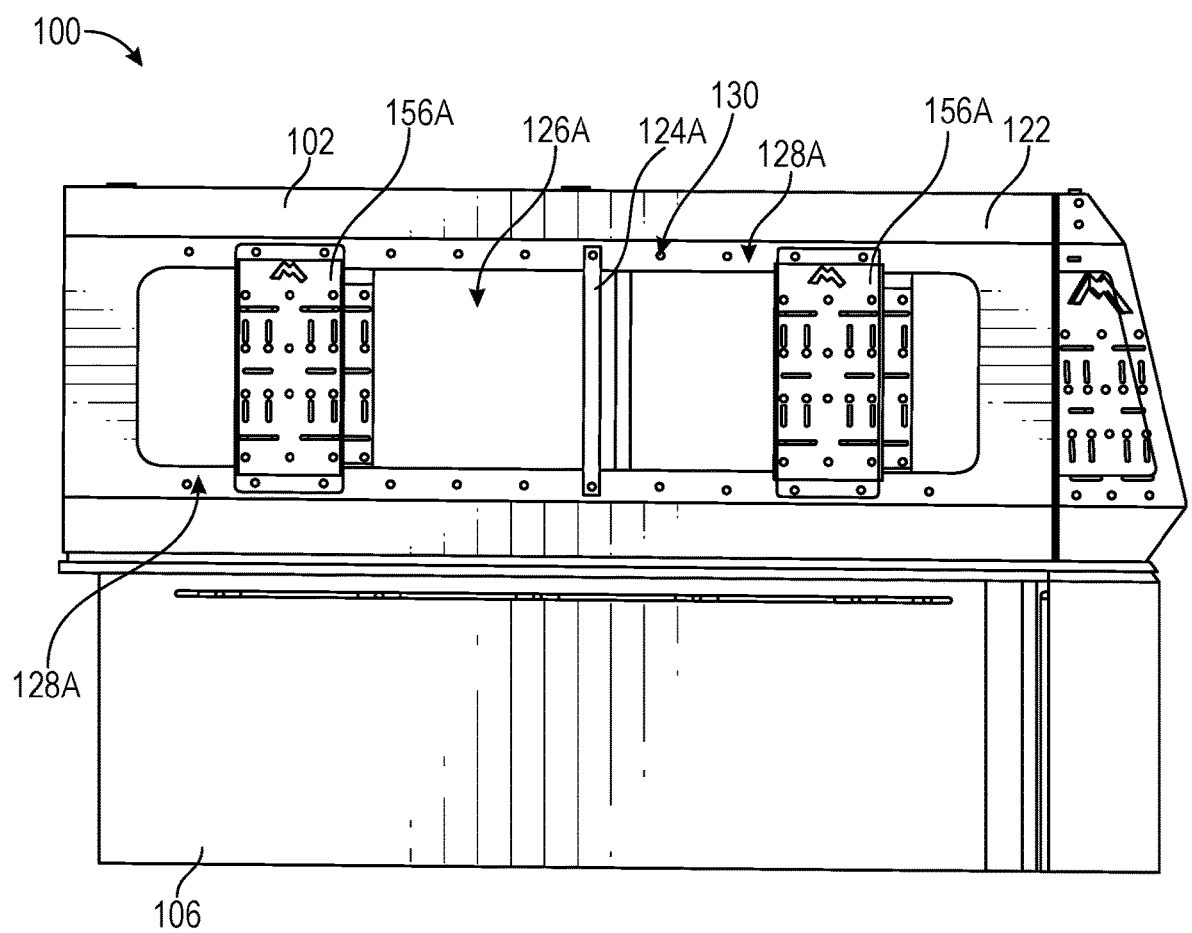
FIG. 4 illustrates a left side elevation view of a truck bed rack.
Figure 5:
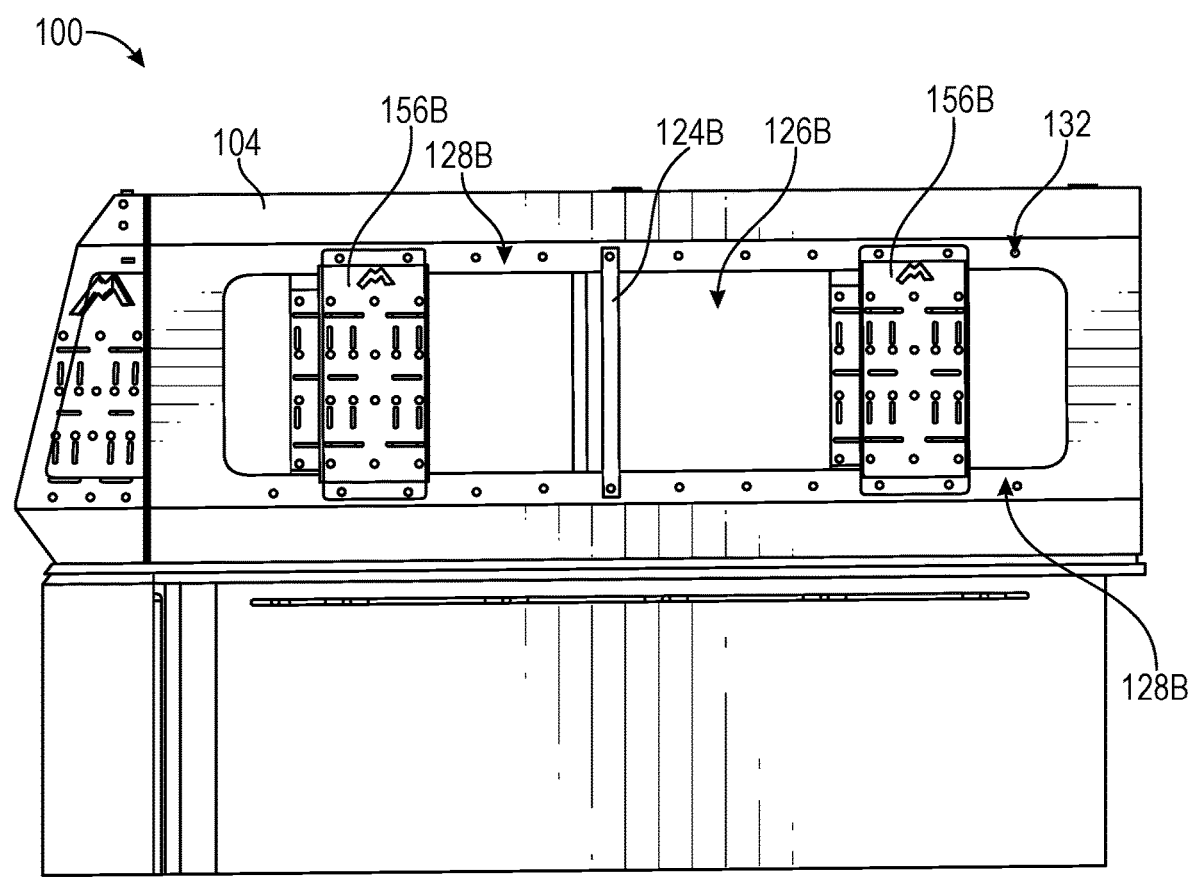
FIG. 5 illustrates a right side elevation view of a truck bed rack.

In FIGS. 4-5, the first panel 102 may comprise, on a first exterior surface 122, a first support bar 124A extending vertically across a first panel aperture 126A. The second panel 104 may also comprise a second support bar 124B extending vertically across a second panel aperture 126B. The first and second support bars 124A, 124B give added strength to the first and second panels 102, 104. The first and second support bars 124A, 124B may couple to first exterior accessory sites 128A and second exterior accessory sites 128B, respectively. The first and second exterior accessory sites 128A, 128B may run longitudinally on a top and a bottom of the first and second panel apertures 126A, 126B, respectively. The first exterior accessory site 128A may comprise first accessory apertures 130 so as to receive the first support bar 124A, and the second exterior accessory site 128B may comprise second accessory apertures 132 so as to receive the second support 124B. Side accessory plates 156A, 156B may also couple to the exterior accessory sites 128A, 128B (such as by using nuts and bolts), allowing a user to couple numerous accessories thereto, as will be discussed later herein. The side accessory plates 156A, 156B span the panel apertures 126A, 126B and may be positionable thereon using the plurality of accessory apertures 130, 132, respectively. It will be appreciated that while support bars 124A, 124 are shown, they are not required, and the side accessory plates 156A, 156B may provide the additional support by spanning the apertures 126A, 126B. However, they may also be used in combination.

Figure 6:
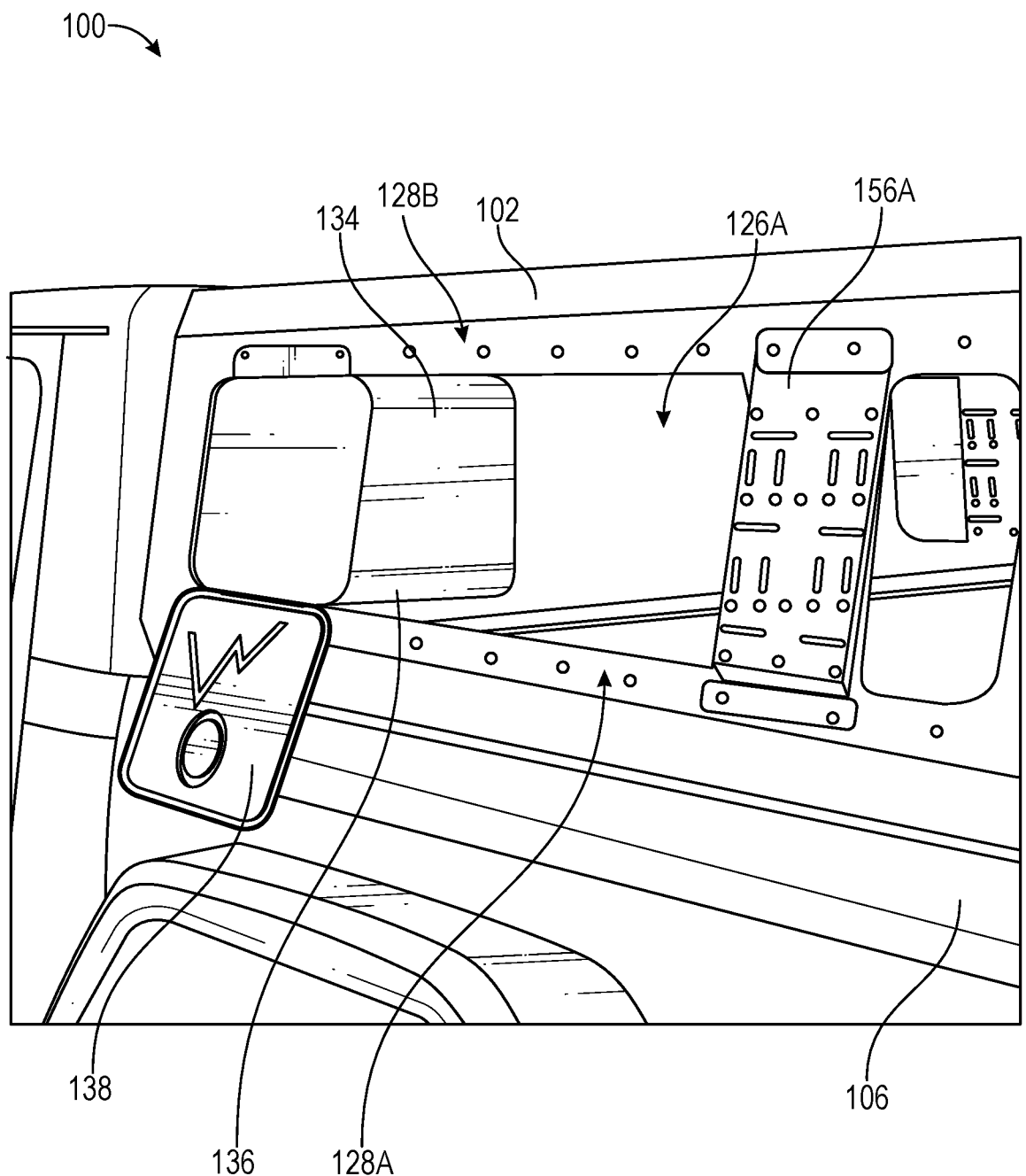
FIG. 6 illustrates a left side perspective view of a cargo box in an opened configuration coupled to a first panel of a truck bed rack.
Figure 7:
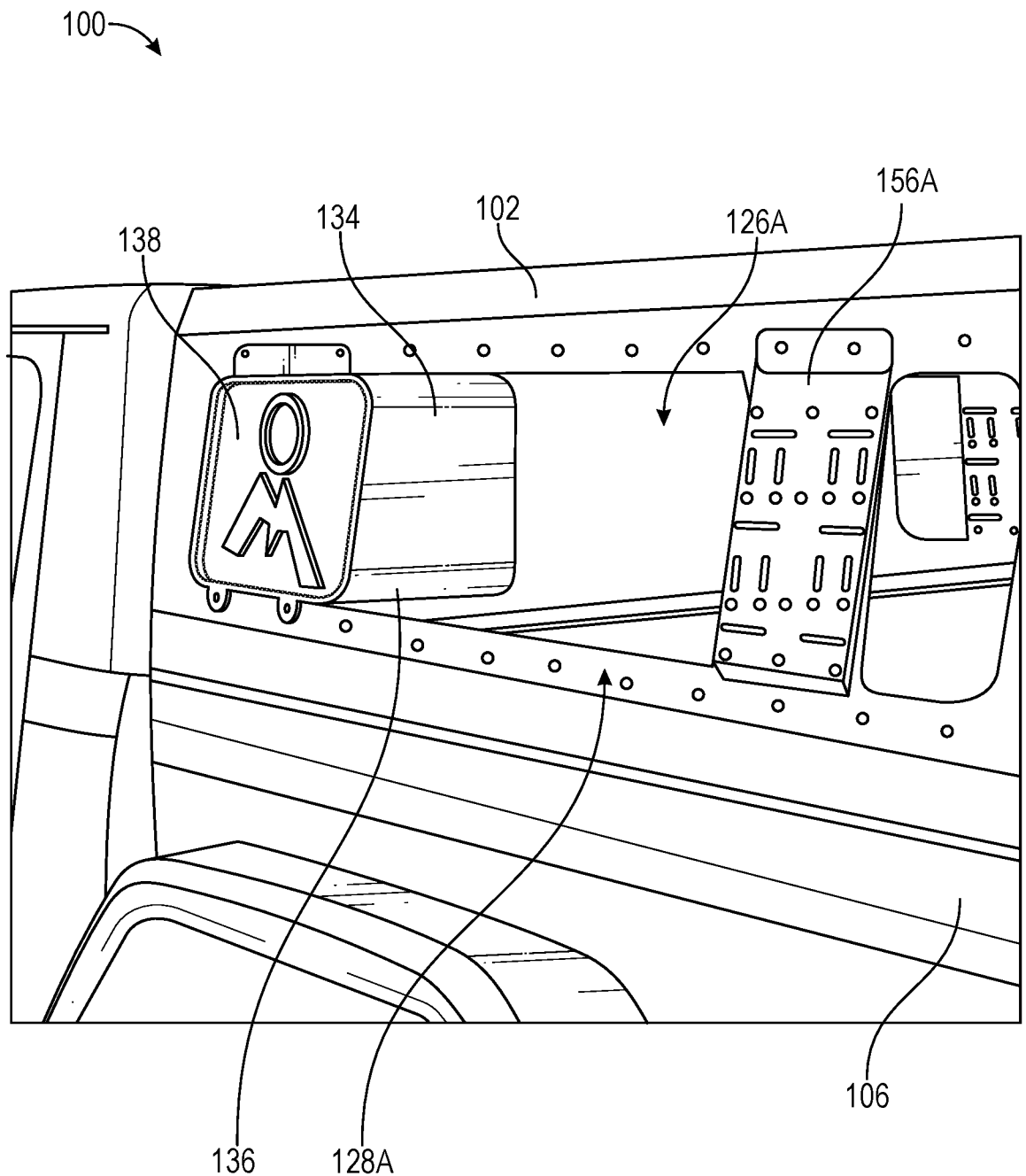
FIG. 7 illustrates a left side perspective view of a cargo box in a closed configuration coupled to a first panel of a truck bed rack.

In one embodiment, as shown in FIGS. 6-7, the first panel aperture 126A and/or the second panel aperture 126B may receive a cargo box 134 therethrough, which may be coupled to the first and second accessory sites 128A, 128B via nuts and bolts or other securement mechanisms. The cargo box 134 may comprise a housing 136 with a lid 138 hingedly coupled thereto.

Figure 8:
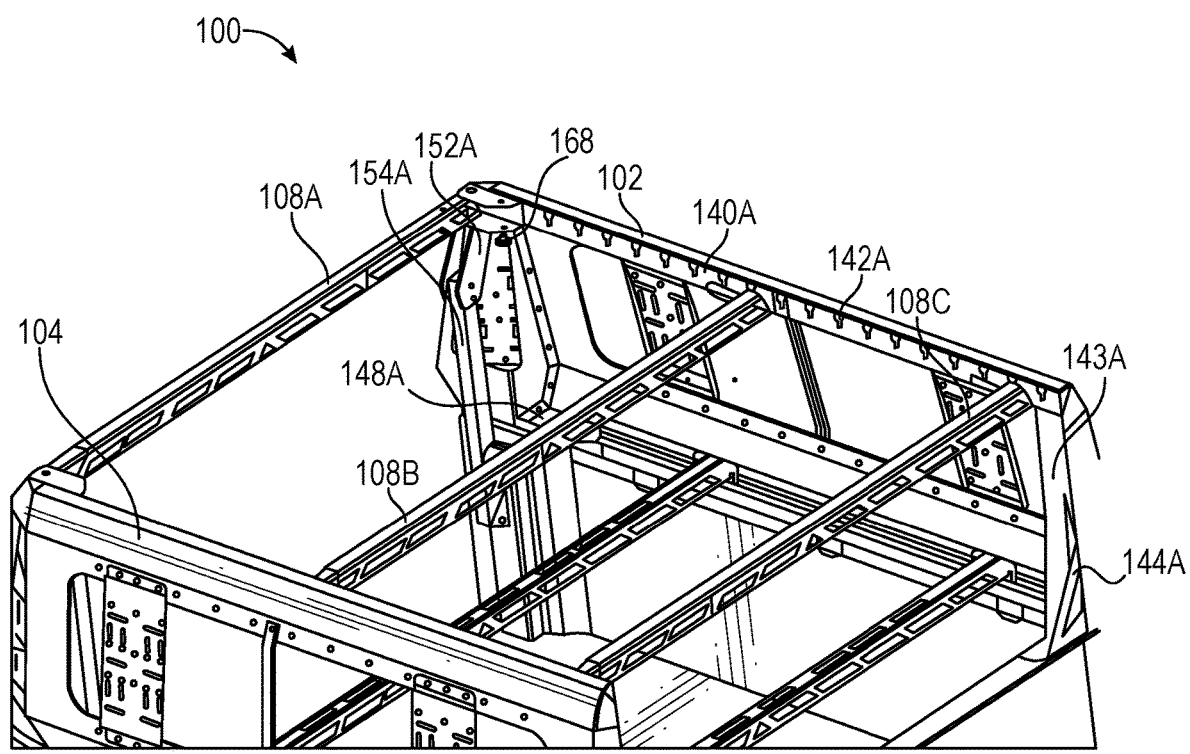
FIG. 8 illustrates a top, rear perspective view of a truck bed rack.
Figure 9:
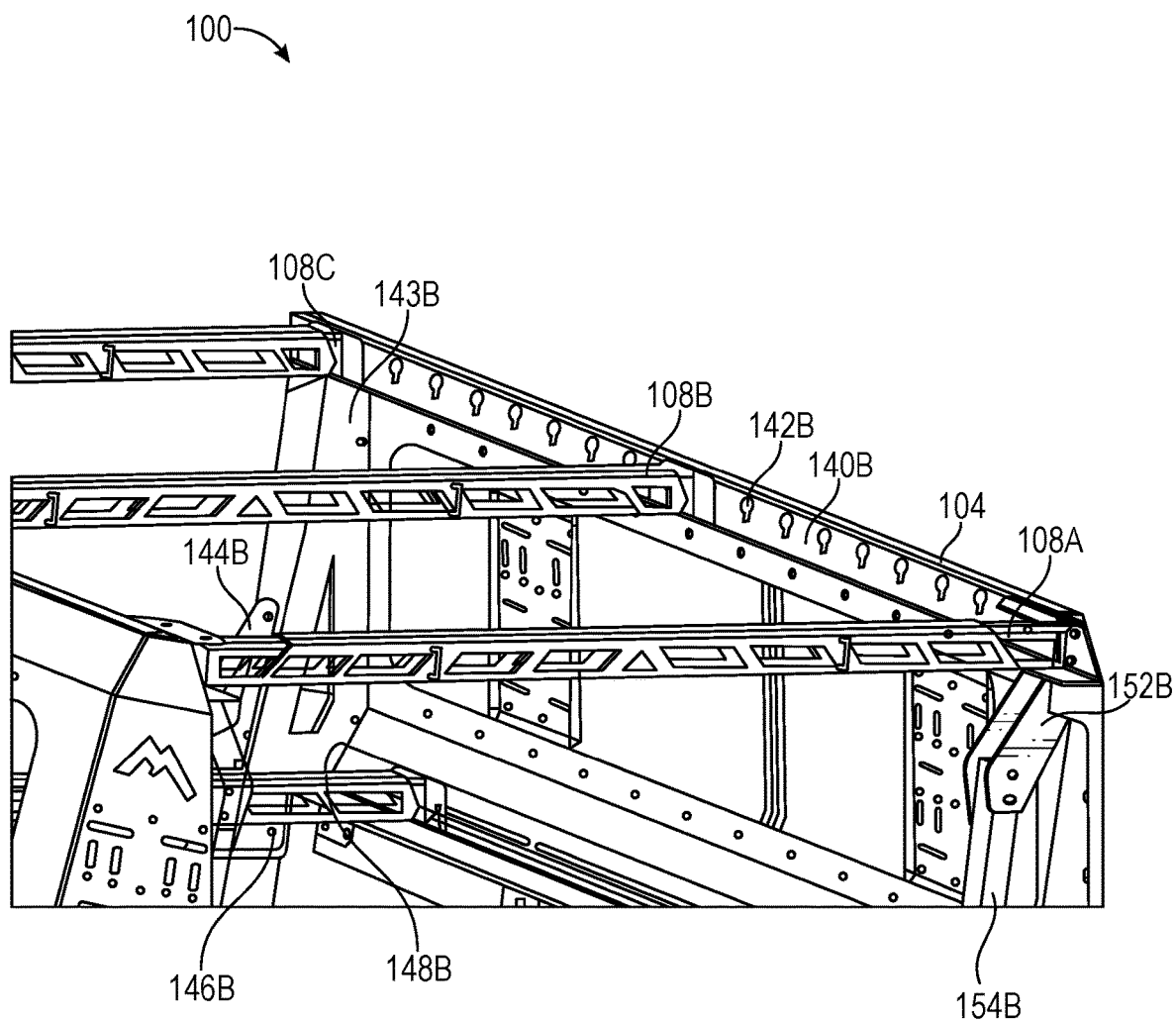
FIG. 9 illustrates a top, front perspective view of a truck bed rack.

Further, as depicted in FIGS. 8-9, the first panel 102 may comprise a first track 140A with first track apertures 142A (e.g., keyhole apertures), and the second panel 104 may comprise a second track 140B with second track apertures 142B (e.g., keyhole apertures). While tracks are shown with apertures, it will be appreciated that, in an alternate embodiment, slotted rails or channels may be used. The first and second tracks 140A, 140B may be positioned on the top of the inside surface of the first and second panels 102, 104. The first and second tracks 140A, 140B may receive the first, second, and third upper bars 108A-108C (or any number of bars). The first panel 102 may further comprise a first leg 143A to add rigidity to the first panel 102 and a first rear bracket 144A with first mounting apertures 146A (shown in FIG. 10) to receive, for example, bolts and nuts to assist in securing the first panel 102 to the truck bed 106. Similarly, the second panel 104 may comprise a second leg 143B and a second rear bracket 144B with second mounting apertures 146B. Referring to FIG. 2, on a first base 148A, which rests on or is proximal to a rail of the truck bed, the first panel 102 may comprise first apertures 150A, and on a second base 148B, the second panel 104 may comprise second apertures (not shown but the same as 150A).

As an example, to attach the first panel 102 to the truck bed 106, a user would place the first panel 102 on a first bed rail of the truck bed 106. The user would then place the coupling bracket 112A with panel apertures 118 on the first base 148A with the panel apertures 118 being aligned with the first apertures 150A. After the panel apertures 118 and the first panel apertures 150A are aligned, the user may place bolts therein, securing the first panel 102 and the coupling bracket 112A to the truck bed 106. To further secure the first panel 102, the user would place bolts in the first mounting apertures 146A on the first rear bracket 144A as well as bolts through the bed apertures 120 on the coupling bracket 112A. Coupling the second panel 104 to the truck bed 106 occurs in a similar manner as the first panel 102. Instead of using bolts, a user may also secure the base 148A, 148B and/or accompanying bracket 112A, 112B to the truck bed rail using clamps (e.g., camper clamps, shell clamps, or similar clamps).

Figure 10:
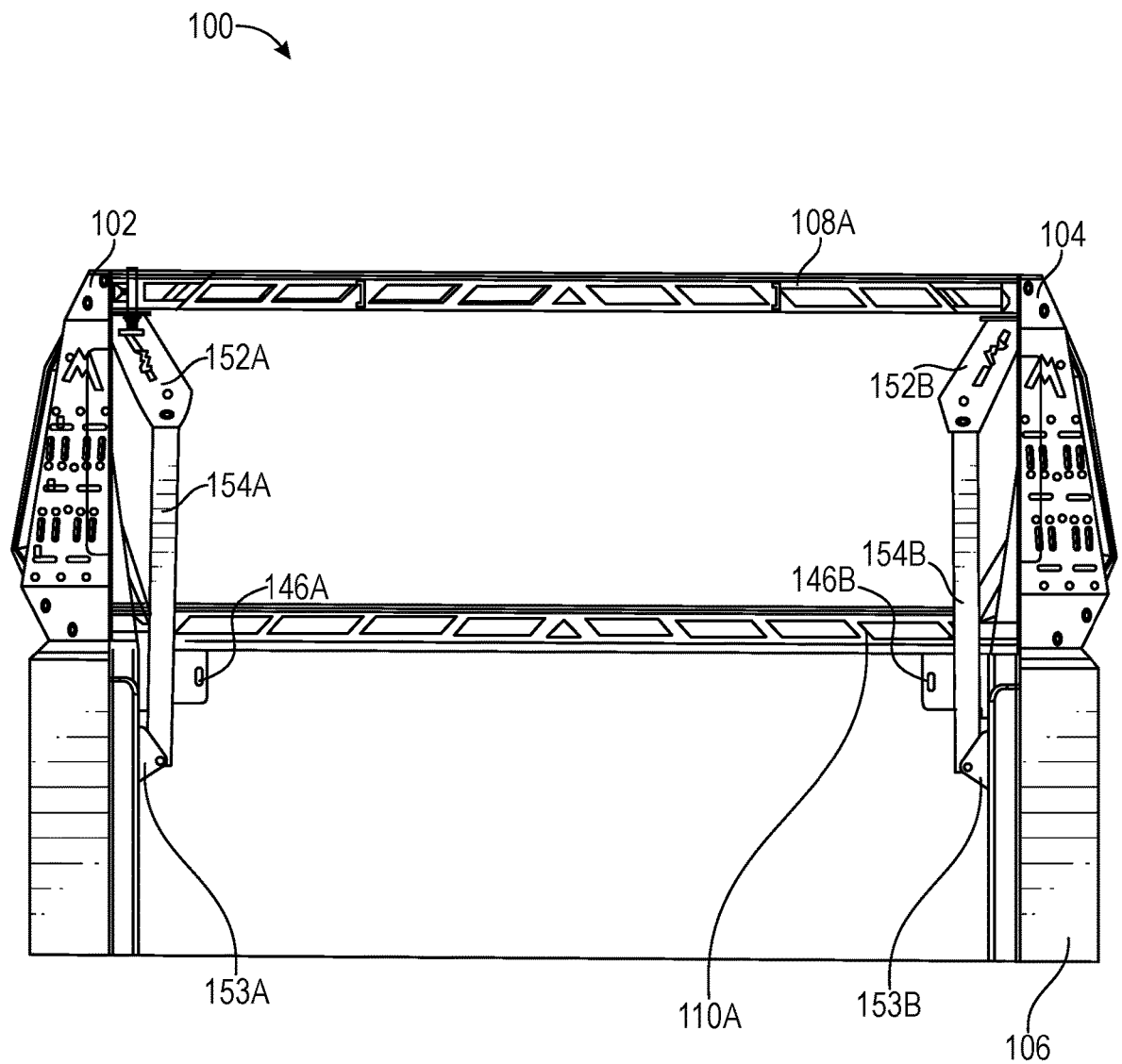
FIG. 10 illustrates a front elevation view of a truck bed rack.

Additionally, as illustrated in FIG. 10, the first panel 102 may couple to the truck bed 106 via a first support bracket 152A and a first support member 154A (e.g., tube, leg, etc.) while the second side panel 104 may couple to the truck bed 106 via a second support bracket 152B and a second support member 154B (e.g., tube, leg, etc.). The first and second support brackets 152A, 152B are coupled to the first and second panels 102, 104, respectively, and the first and second support members 154A, 154B may be coupled to the brackets 152A, 152B. It will be appreciated that the first and second support brackets 152A, 152B allow the first and second supports members 154A, 154B to pivot so as to be coupleable to the side of the truck bed 106 via bed brackets 153A, 153B or the bottom of the truck bed 106.

Figure 11:
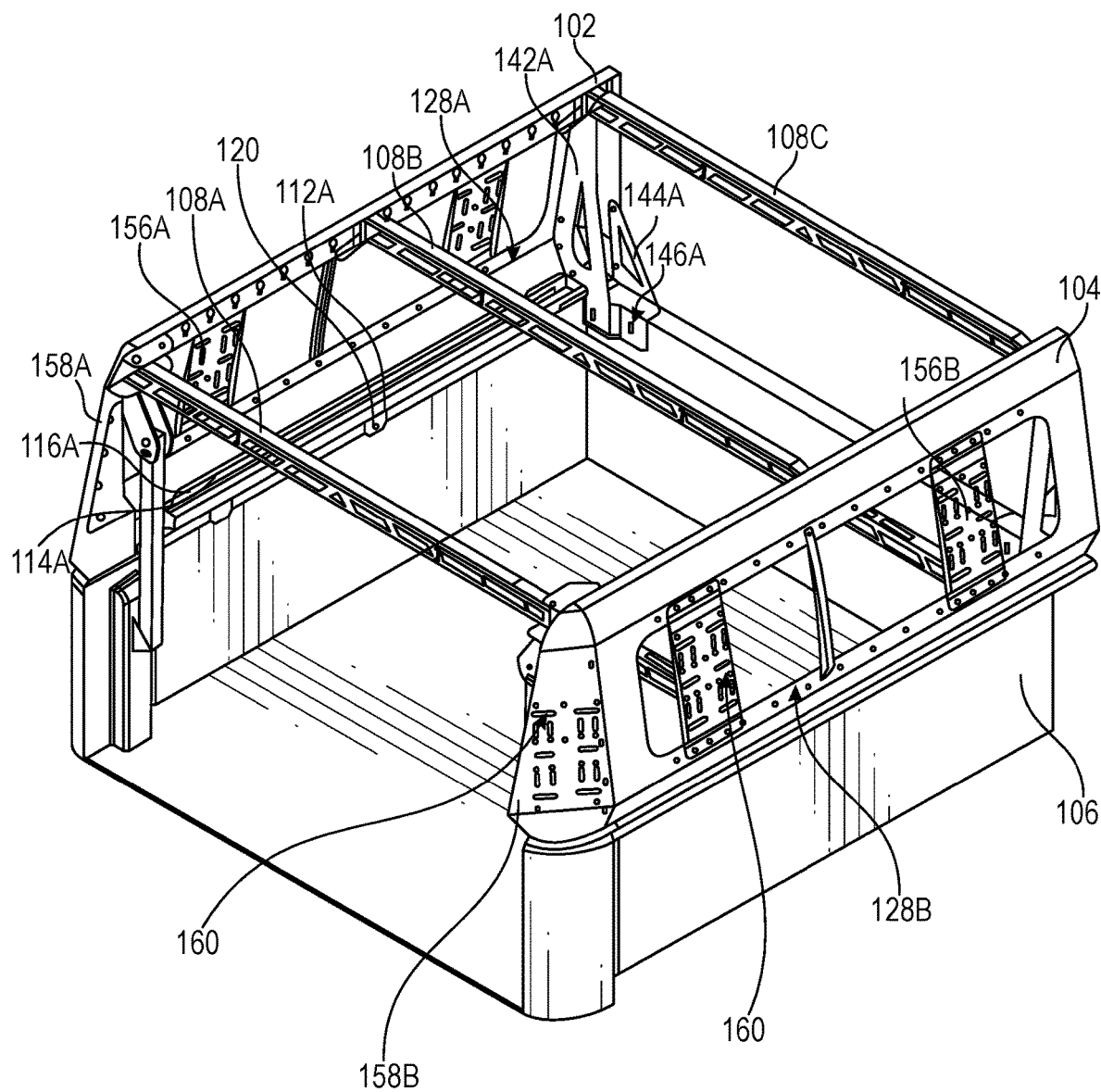
FIG. 11 illustrates a front, top perspective view of a truck bed rack.
Figure 12:
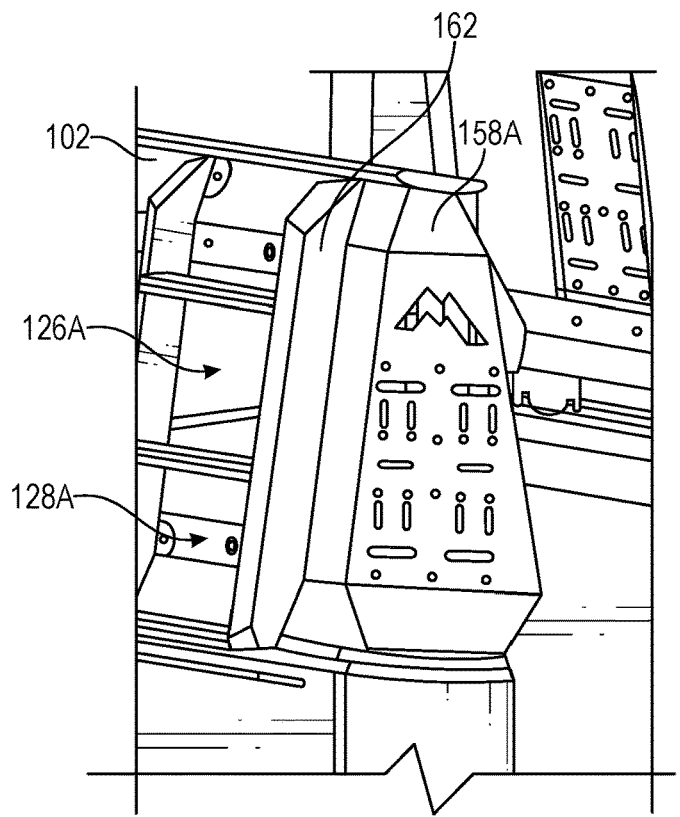
FIG. 12 illustrates a left side perspective view of a ladder coupled to a first panel of a truck bed rack.
Figure 13:
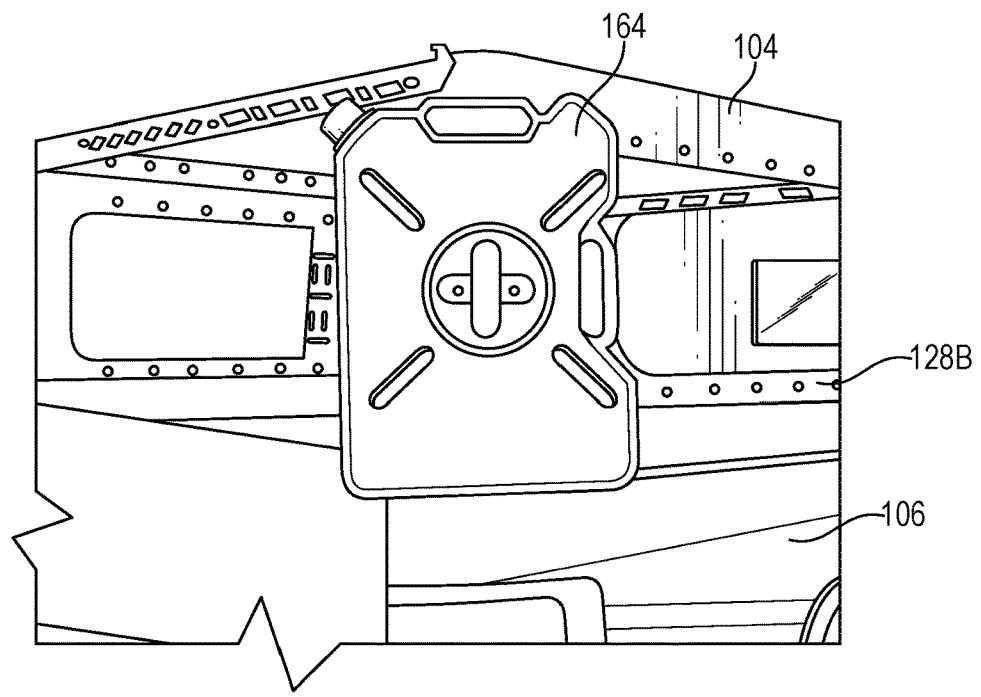
FIG. 13 illustrates a right side perspective view of a fuel canister coupled to a second panel of a truck bed rack.

As shown in FIG. 11, the first and second side panels 102, 104 may further comprise side accessory plates 156A, 156B and rear accessory couplers 158A, 158B, which may be interchangeable between the first and second panels 102, 104. The side accessory plates 156A, 156B may couple to the first and/or second accessory sites 128A, 128B. The side accessory plates 156A, 156B and the rear accessory couplers 158A, 158B may comprise accessory apertures 160 for brackets, which may include circular apertures, t-slot tracks, and c-channels (seat track), among others. For example, in one embodiment, the accessory plates 156A, 156B and rear accessory couplers 158A, 158B may receive a ladder 162 (FIG. 12), a fuel canister 164 (FIG. 13), or any other accessory.

Figure 14:
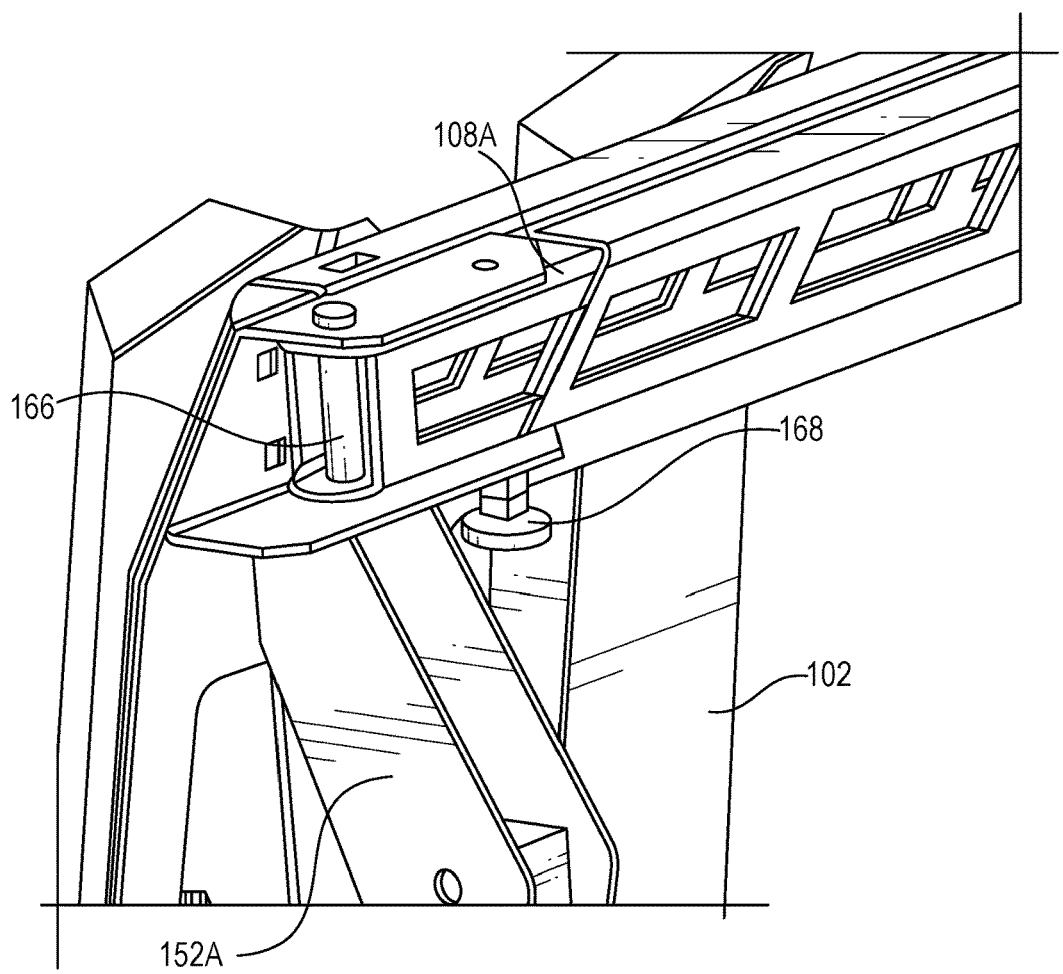
FIG. 14 illustrates a perspective view of a first upper bar hingedly coupled to a hinge bracket.
Figure 15:
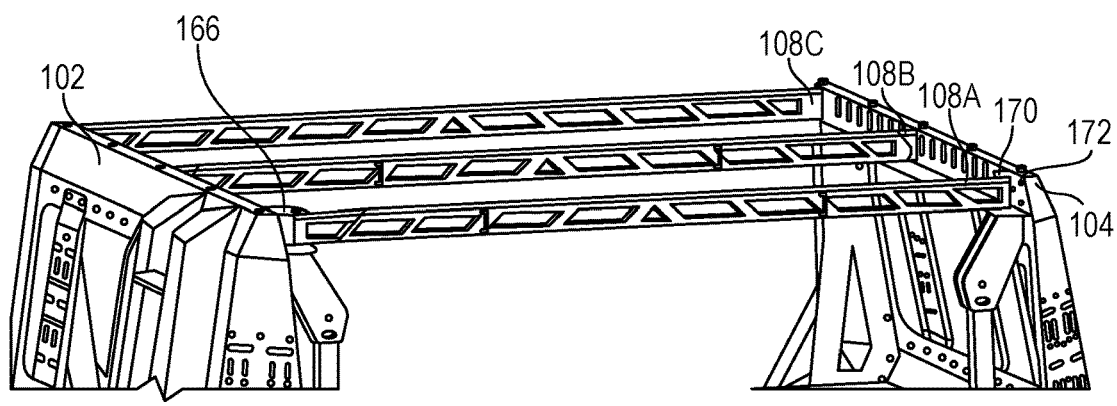
FIG. 15 illustrates a front perspective view of the first, second, and third upper bars of a truck bed rack.

As illustrated in FIGS. 14-15, once the side panels 102, 104 are coupled to the truck bed 106, the first upper bar 108A may then be pivotally coupled to a first hinge bracket 166. When the first upper bar 108A is pivoted inwardly towards the first panel 102, it may be locked into position via a pin lock 168 so as to remain in a closed position, allowing for full access to the bed. While the pin lock 168 is shown, it will be appreciated that magnets, straps, or other locking mechanisms may be used. The first upper bar 108A may pivot 0-180 degrees to completely free the truck bed 106 from overhead obstructions, allowing any type of cargo to be placed in the truck bed 106. The first upper bar 108A may be coupled to the second panel 104 via a second bracket 170. The second bracket 170 may comprise a locking aperture 172 to receive a nut and bolt, pin, etc. This may aid in keeping the panels 102, 104 stabilized. However, the second bracket 170 is not required and the first upper bar may couple to the second panel 104 using the track apertures 142B. It will also be appreciated that the first upper bar 108A may be positioned along the length of the first side panel 102 and second side panel 104, allowing a user to determine its placement, ideally so that when in a closed position it does not extend longitudinally out of the first side panel 102, although it may. The hinge bracket 166 allows a user to easily "remove" the upper bar 108A by storing it in the closed position, allowing for unobstructed access to the bed of the truck. When needed, a user simply actuates the pin lock 168, pivots the upper bar 108A, and secures it to the second panel 104, creating a crossbar for support or other utilization. The pivoting crossbars disclosed herein overcome the problem in the industry, namely, the ability to have unobstructed access to the bed without having to remove the entire bed rack.

Figure 16:
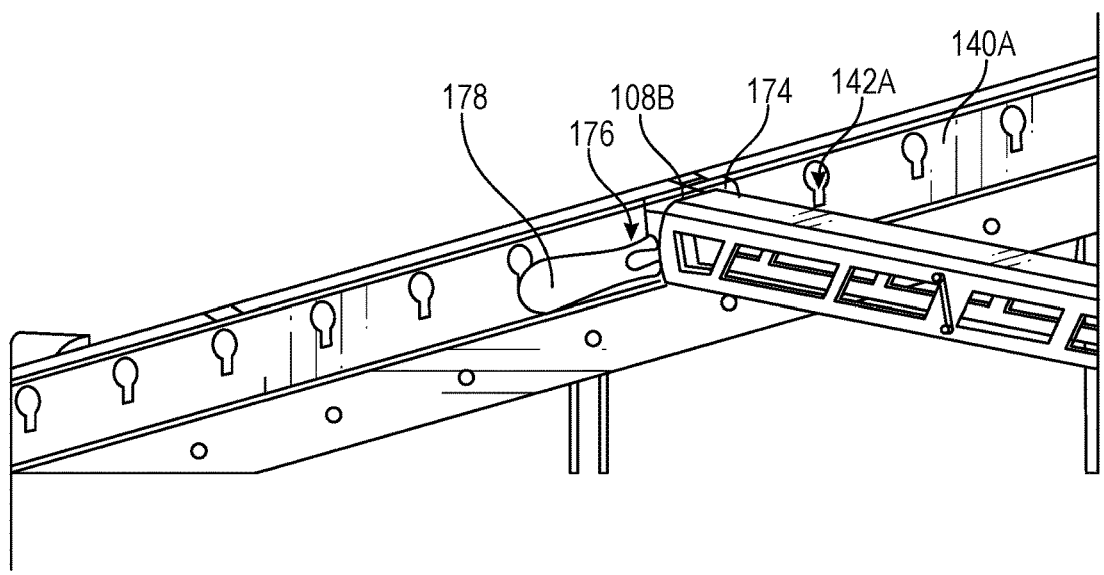
FIG. 16 illustrates a perspective view of a second upper bar coupled to a first panel of a truck bed rack.
Figure 17:
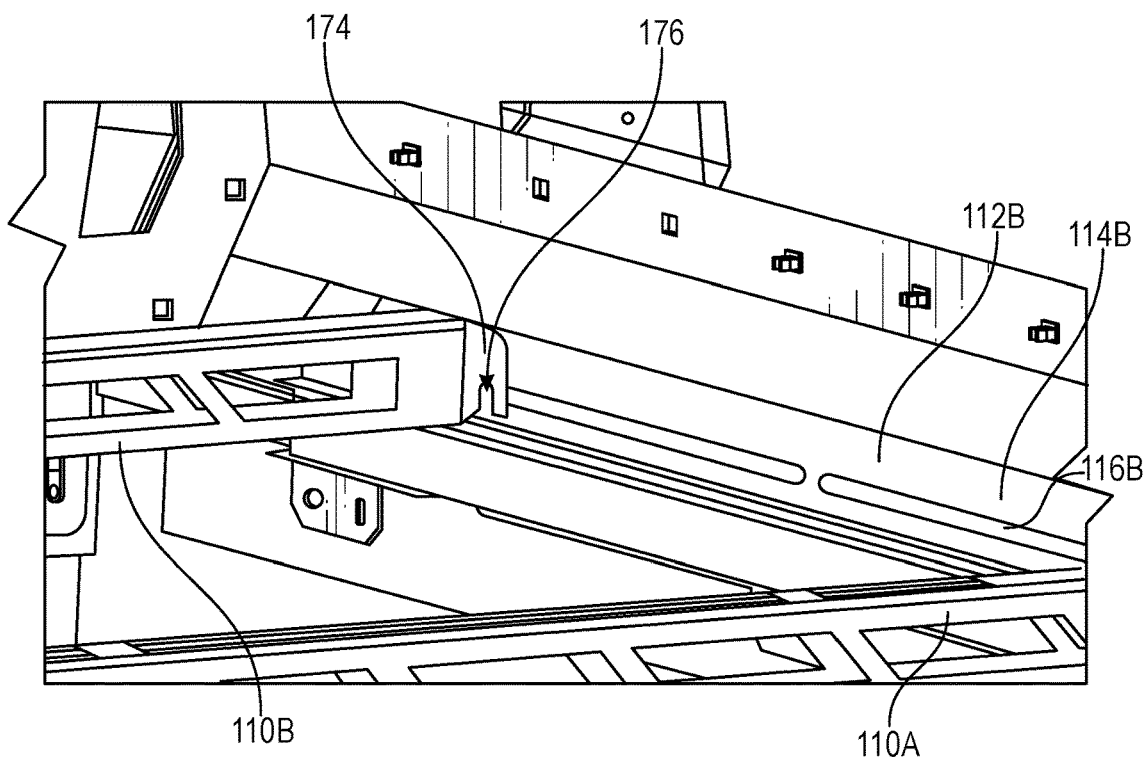
FIG. 17 illustrates a front perspective view of a first and a second lower bar coupled to a coupling bracket of a truck bed rack.

In FIGS. 16-17, the second and third upper bars 108B, 108C may couple to the first and second panels 102, 104 via the first and second tracks 140A, 140B. For example, the second and third upper bars 108B, 108C may comprise attachment panels 174 with channels 176, which interact with the first and second track apertures 142A, 142B. To lock the second and third upper bars 108B, 108C in position between the first and second panel 102, 104, the second and third upper bars 108B, 108C are placed against the first and second track apertures 142A, 142B. In other words, the attachment panels 174 with the bar channels 176 receive, for example, a carriage bolt or a camlock 178, which couples the second and third upper bars 108B, 108C to the first and second track apertures 142A, 142B, respectively. It will be appreciated that the second and third upper bars 108B, 108C may be removably attachable from the first and second panels 102, 104, allowing any cargo to be inserted into the truck bed 106. The second and third upper bars 108B, 108C may also be horizontally positionable in relation to the truck bed so as to be positioned anywhere along the first and second track 140A, 140B. Further, while three upper bars 108A-108C are shown, it will be appreciated that one or more bars may be used on the truck bed rack 100. For example, in some embodiments, a user may desire five upper bars, depending on the cargo that will be carried. The first, second, and third uppers bars 108A-108C may be level with the roof of the truck. It will be appreciated that with the upper bars 108A-108C being flush with the truck roof, wind noise is decreased. In an alternate embodiment, the upper bars 108A-108C may be positioned above the first and second panels 102, 104.

Figure 18:
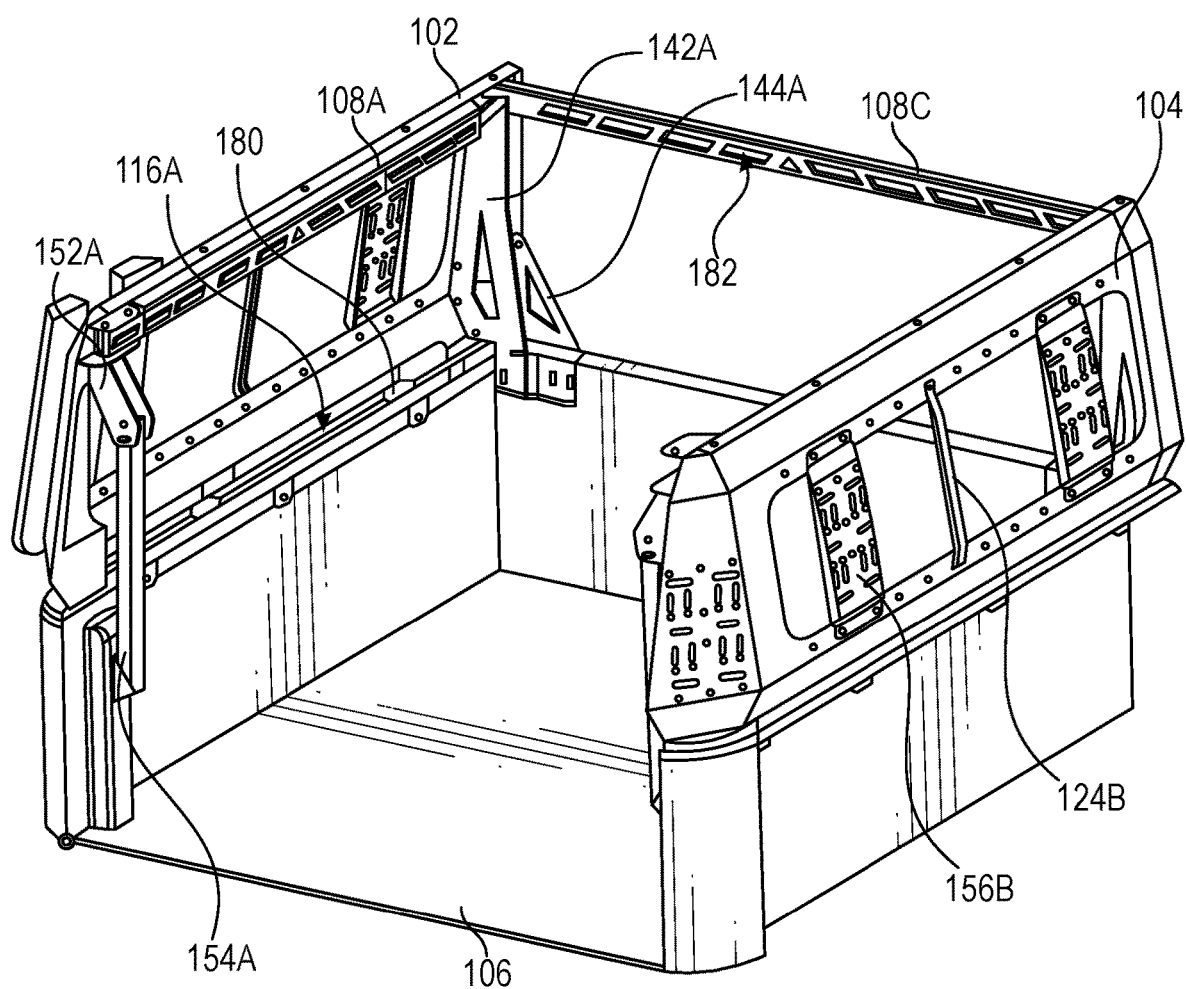
FIG. 18 illustrates a front, top perspective view of a truck bed rack.

As briefly described above, and referring to FIGS. 17-18, the coupling brackets 112A, 112B may comprise the sidewall 114A, 114B with channels 116A, 116B to receive the first and second lower bars 110A, 110B. In a similar manner to the second and third upper bars 108B, 108C, the first and second lower bars 110A, 110B may couple to the channels 116A, 116B via a carriage bolt or camlock 180. In particular, once the bar channels 174 are placed against the coupling brackets 112A, 112B and in alignment with the channels 116A, 116B, the camlock 180 may be inserted therethrough and secured. Once the camlock 180 is released, the first and second lower bars 110A, 110B are positionable (e.g., may slide horizontally) along the channels 116A, 116B to the desired location. Once positioned, the user may then again actuate the camlock 180 and secure the first and second lower bars 110A, 110B in position. This allows a user to make custom changes quickly and easily. For example, the first and second lower bars 110A, 110B may allow a user to place a bed or other accessory thereon. It should be noted that the first and second lower bars 110A, 110B and the second and third upper bars 108B, 108C may be interchangeable with each other. Accordingly, the means of attachment for the second and third upper bars 108B, 108C is similar to the first and second lower bars 110A, 110B. If a user desires to place large cargo loads in the truck bed 106, then the upper and lower bars may be removed, allowing access to the entire truck bed (FIG. 18). Additionally, all of the upper and lower bars 108A-108C and 110A-110B may comprise accessory slots 182, where bikes, bags, or any other type of may couple thereto.

Figure 19:
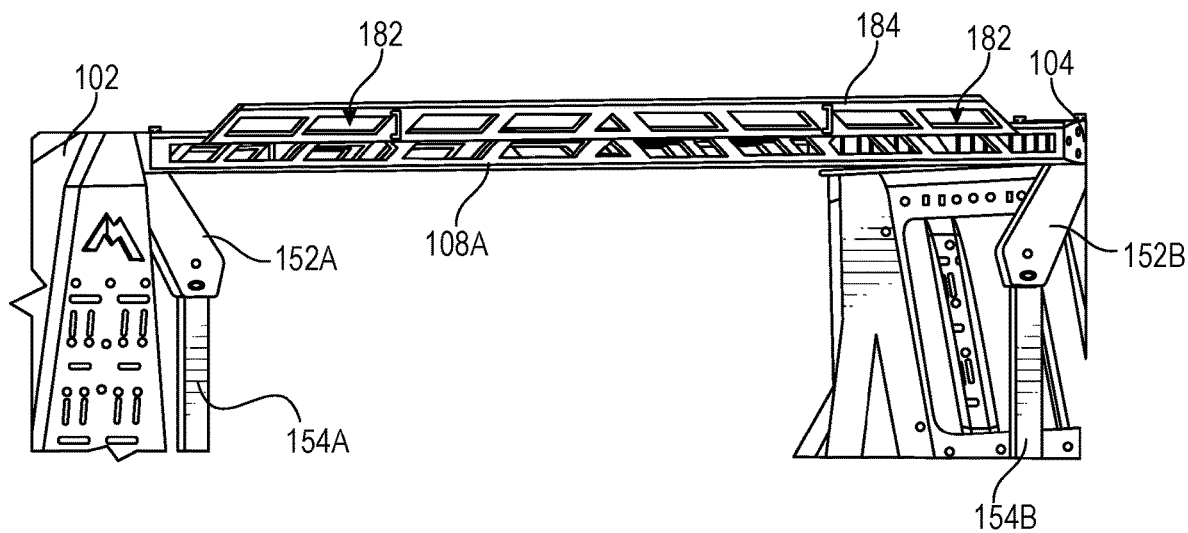
FIG. 19 illustrates a front perspective view of a first upper bar with a bar extension coupled thereto.

As shown in FIG. 19, the first, second, and third upper bars 108A-108C and the first and second lower bars 110A-110B may comprise a bar extension 184. The bar extensions 184 may nest with and couple to the upper and lower bars 108A-108C and 110A-110B. Due to the upper bars 108A-108C typically being flush with the top of the truck, loads, such as a canoe, could not be carried without causing damage to the top of the vehicle. Accordingly, the bar extensions 184 may be raised vertically from the upper bars 108A-108C, for example, so as to increase the height of the upper bars, thereby raising cargo above the roof of the truck. The bar extensions 184 may be secured in a raised or lowered position using nuts and bolts, cotter pins, or other locking means.

Figure 20:
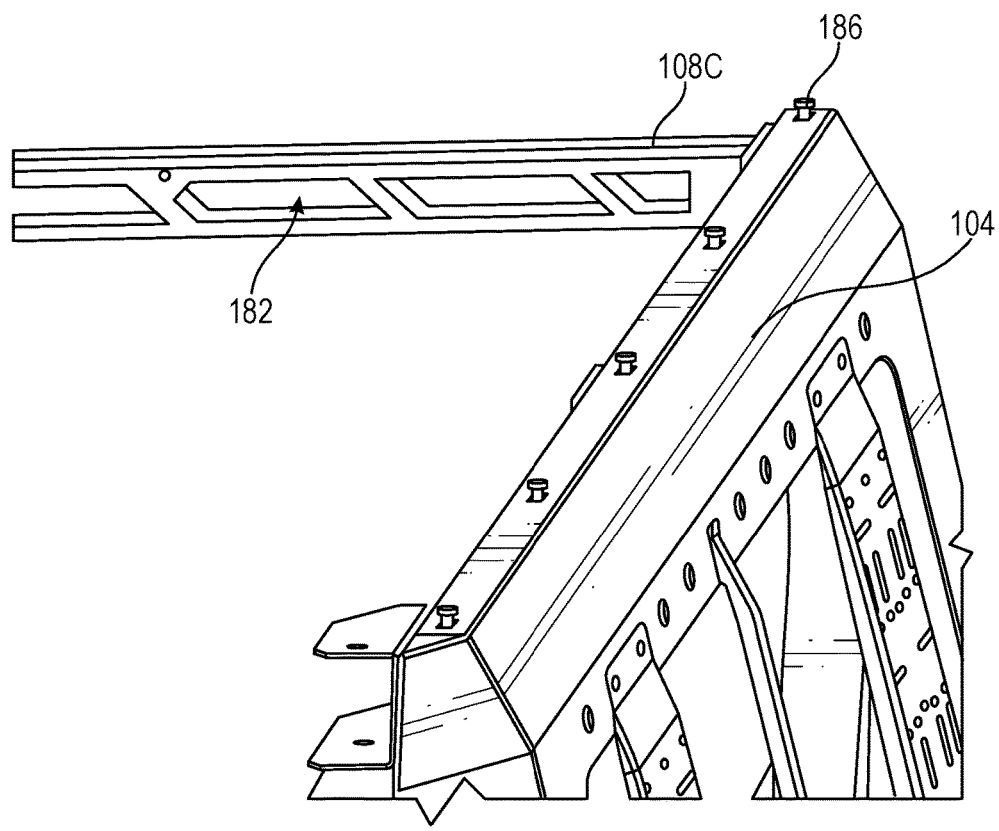
FIG. 20 illustrates a top perspective view of roof couplers of a truck bed rack.
Figure 21:
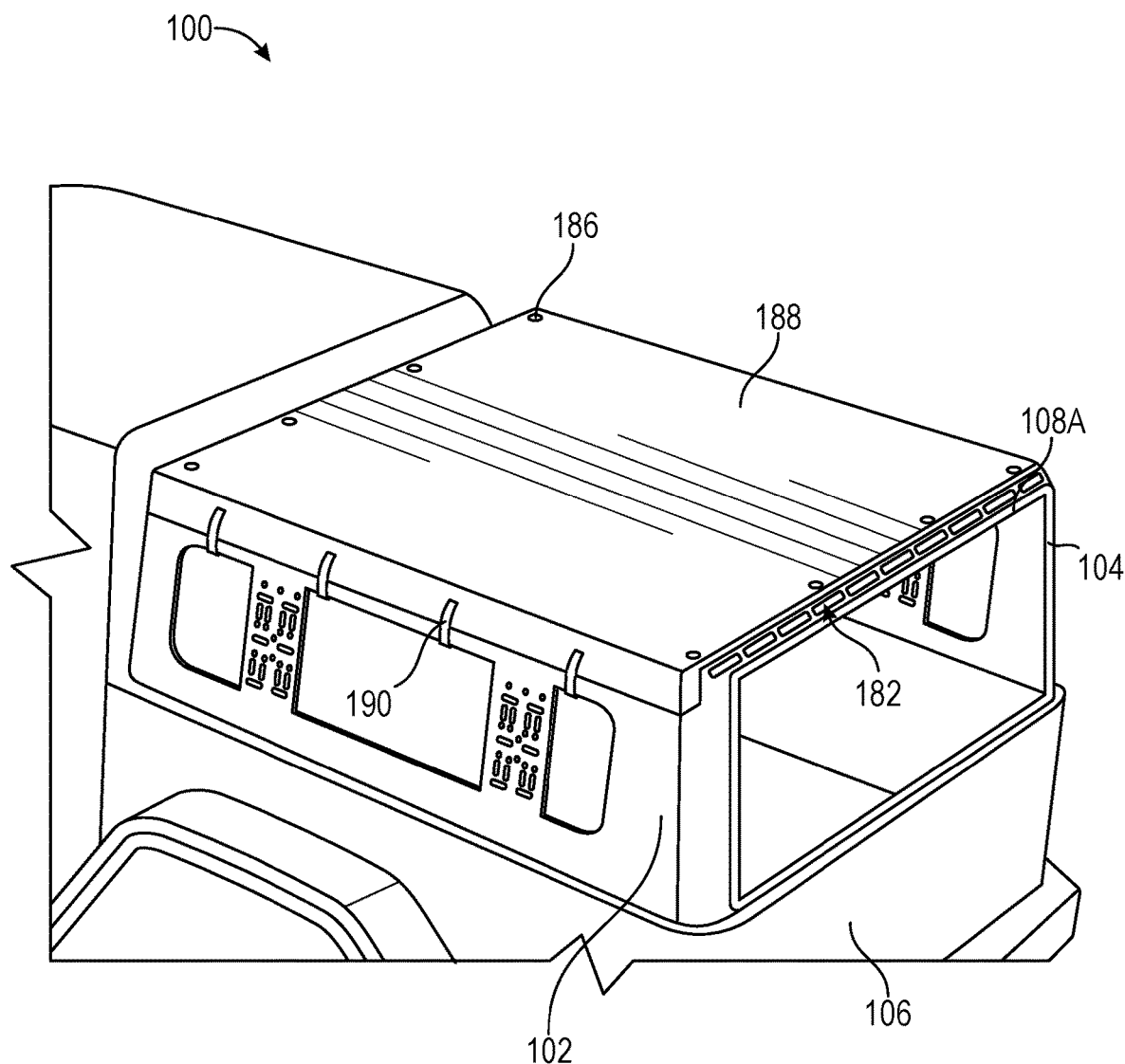
FIG. 21 illustrates a top perspective view of a removably attachable cover coupled to a first and a second panel of a truck bed rack.

In one embodiment, shown in FIGS. 20-21, both the first and second panels 102, 104 may comprise roof couplers 186. Specifically, the roof couplers 186 may be positioned along a top edge of both the first and second panels 102, 104. The roof couplers 186 may be a protrusion that receives a removably attachable cover 188 which may protect the truck bed 106 and cargo from rain, snow, sunlight, etc. The removably attachable cover 188 may be canvas, plastic, carbon fiber, or any other type of material. In one embodiment, the removably attachable cover 188 may be secured to the first and second panels 102, 104 via hooks 190 (e.g., camlocks, spring-bar, hook and latch, cotter pins, etc.).

In one embodiment, the truck bed rack comprises a raised double pivoting cross bar. For example, primary upper bars extending between the first and second panels may remain in place for a top mounted device, like a roof tent, while secondary upper bars pivot or slide out to provide support for a shade structure, hammock, or roof tent expansion area. In other words, this embodiment provides primary and secondary upper bars to support a top load and pivot at various angles, or slide out, to support structures such as the shade awning, etc.

It will also be appreciated that systems, apparatus, and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A truck bed rack, comprising:
a first side panel coupleable to a first bed rail of a truck and extending vertically therefrom, the first side panel comprising a rear accessory coupler;
a second side panel coupleable to a second bed rail of a truck and extending vertically therefrom, the second side panel comprising a rear accessory coupler;
wherein the first side panel and the second side panel each comprise a base configured to rest on the respective first and second bed rail.

2. The truck bed rack of claim 1, wherein each side panel further comprises a leg and a bracket for coupling each side panel to the respective first and second bed rail.

3. The truck bed rack of claim 1, wherein each side panel is coupled to the respective bed rails using one or more of:
   a. nuts and bolts, and
   b. clamps.

4. The truck bed rack of claim 1, further comprising:
one or more upper bars extending between the first and second panels;
wherein the one or more upper bars are positionable and removably attachable to the first and second panels to allow utilization of the entire truck bed.

5. The truck bed rack of claim 1, further comprising:
one or more upper bars extending between the first and second panels;
wherein the one or more upper bars are positionable, pivotable, and removably attachable to the first and second panels to allow utilization of the entire truck bed.

6. The truck bed rack of claim 1, further comprising one or more lower bars interposed between the base of the first and second panels, the one or more lower bars configured to be positionable along the length of each respective base via a bracket with channels therein coupled to each base, and removably attachable using bolts or camlocks.

7. The truck bed rack of claim 1, wherein the first side panel comprises a first mounting panel extending vertically across a first panel aperture, and wherein the second panel comprises a second mounting panel extending vertically across a second panel aperture.

8. The truck bed rack of claim 7, wherein the first mounting panel couples to a first exterior accessory site, and the second mounting panel couples to a second exterior accessory site.

9. The truck bed rack of claim 1, further comprising a cargo box passing through a first panel aperture and secured to a first accessory site.

10. The truck bed rack of claim 1, wherein the first panel comprises a first track with first track apertures, and the second panel comprises a second track with second track apertures.

11. The truck bed rack of claim 10, comprising one or more upper bars extending between the first and second panels, wherein the upper bars are positionable along the length of first and second tracks.

12. The truck bed rack of claim 1, further comprising a first support member hingedly coupled to a first support bracket, and a second support member hingedly coupled to a second support bracket.

13. The truck bed rack of claim 12, wherein the first support bracket is coupled to the first panel and the second support bracket is coupled to the second panel.

14. The truck bed rack of claim 1, further comprising coupling brackets having sidewalls with channels, the coupling brackets coupling to the respective base of each side panel.

15. The truck bed rack of claim 1, wherein the first and second panels comprise one or more side accessory plates coupleable to the first and second exterior accessory sites.

16. A truck bed rack comprising:
a first side panel coupleable to a first bed rail of a truck, the first side panel comprising:
    a first track with first track apertures,
    a first accessory coupling site, and
    a first panel aperture;
a second side panel coupleable to a second bed rail of the truck, the second side panel comprising:
    a second track with second track apertures,
    a second accessory coupling site, and
    a second panel aperture;
one or more upper bars spanning a truck bed and removably coupleable to the first track and the second track of the first and second panels;
one or more lower bars spanning the truck bed and removably coupleable to the first and second panels respectively;
wherein the first panel and second panel are each coupled to the truck bed via coupling brackets; and
wherein the one or more upper bars and the one or more lower bars are positionable.

17. The truck bed rack of claim 16, further comprising a first support member hingedly coupled to a first support bracket of the first panel, and a second support member hingedly coupled to a second support bracket of the second panel.

18. The truck bed rack of claim 16, further comprising a removably attachable cover, the cover resting atop each side panel and spanning the truck bed.

19. The truck bed rack of claim 16, wherein the one or more upper bars further comprise a bar extension configured to extend vertically therefrom.

20. A truck bed rack, comprising:
a first side panel coupleable to a first bed rail of a truck and extending vertically therefrom;
a second side panel coupleable to a second bed rail of a truck and extending vertically therefrom;
a first support member hingedly coupled to a first support bracket, and a second support member hingedly coupled to a second support bracket;
wherein the first side panel and the second side panel each comprise a base configured to rest on the respective first and second bed rail.

* * * * *